V. GIL-DELGADO Y OLAZABAL.
RESILIENT WHEEL.
APPLICATION FILED OCT. 27, 1908.
1,005,021.
Patented Oct. 3, 1911.
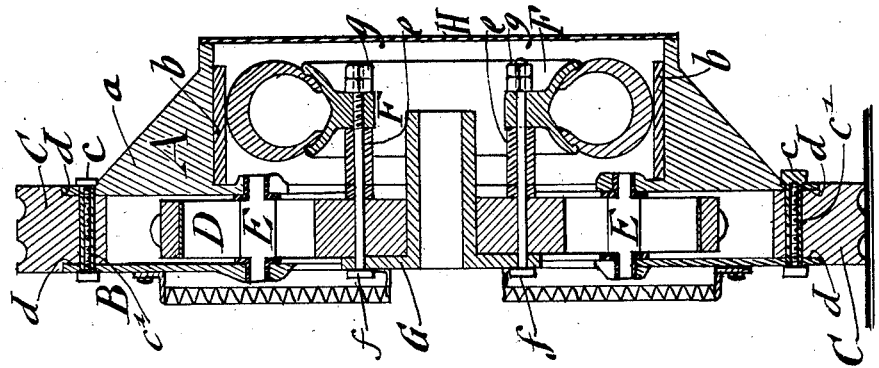
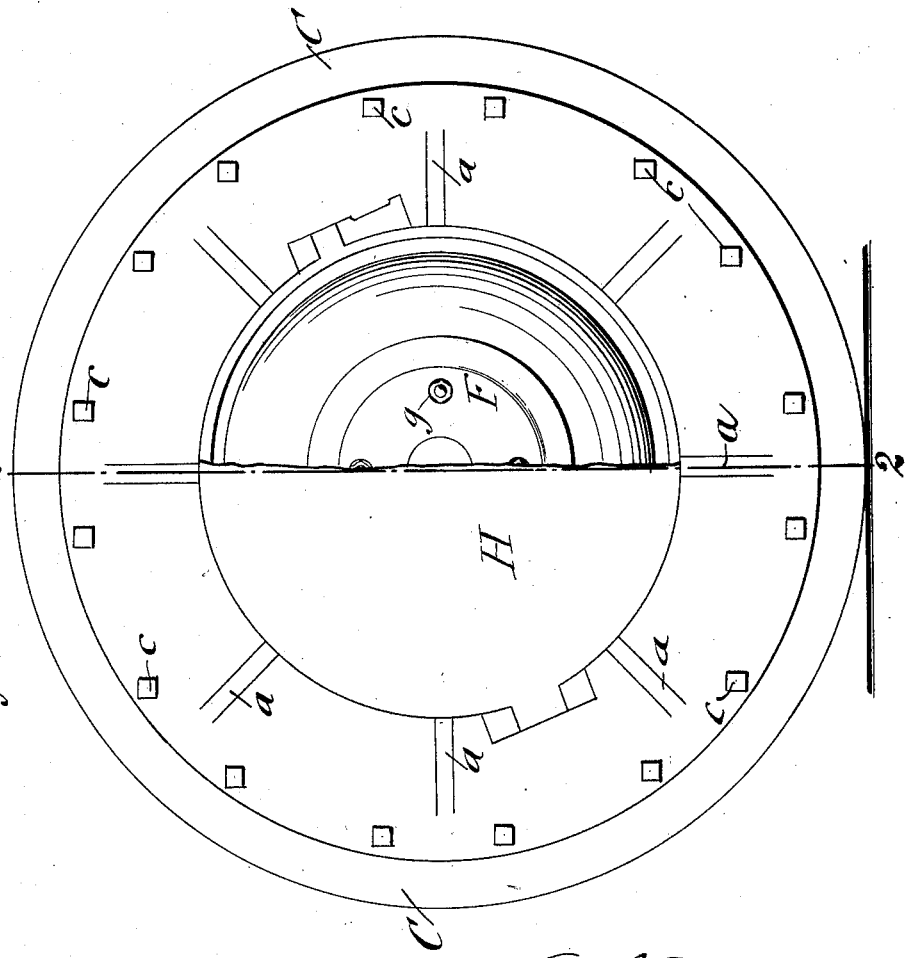

UNITED STATES PATENT OFFICE.

VICENTE GIL-DELGADO Y OLAZABAL, OF MADRID, SPAIN.

RESILIENT WHEEL.

1,005,021.　　　　　　　　Specification of Letters Patent.　　　　Patented Oct. 3, 1911.

Application filed October 27, 1908. Serial No. 459,694.

*To all whom it may concern:*

Be it known that I, VICENTE GIL-DELGADO Y OLAZABAL, a subject of the King of Spain, residing at Madrid, in the Kingdom of Spain, have invented certain new and useful Improvements in Resilient Wheels, of which the following is a specification.

This invention relates to a new system of resilient wheels applicable to motor-cars and vehicles of all kinds. The different systems of wheels of this class with pneumatic tires are objectionable for the reason that the tires are subject to puncture when in use, and also subject to bursting under the influence of atmospheric changes. In order to overcome these objections an improved resilient wheel was devised by which the pneumatic tire, instead of being applied to the rim of the wheel, is applied independent thereof so as to supply the proper resiliency without bringing it in direct contact with the ground. This arrangement also permits the tires to be made of a smaller size and less expensive, without diminishing the resiliency of the wheels.

The invention consists of the construction of the resilient wheel hereinafter described and finally pointed out in the claim.

In the accompanying drawing, Figure 1 represents a side-elevation of my improved resilient wheel, part being broken away. Fig. 2 is a vertical transverse section drawn on line 2, 2, Fig. 1, and Fig. 3 shows in detail on a reduced scale the sliding connection between the parts.

Similar letters of reference indicate corresponding parts.

The improved resilient wheel consists of the following parts: Two disks A and B, of equal size, are arranged parallel and co-axial to each other. The outer disk A is provided with eight radial shoulders or ridges $a$ which support at their inner edges a ring $b$. The ring $b$ can be removed at will, it being inclosed by a cover H, which is hinged at one point of the circumference and secured at a diametrically opposite point by a suitable locking device so as to inclose the ring $b$. The disks A and B are connected with each other by screws $c$ and sleeve-shaped nuts $c^1$ so as to secure thereby in a reliable manner an exterior ring C, which ring is securely held in position by the screws and sleeve-shaped nuts and provided with exterior grooves and ribs for preventing "skidding." The inner edges of the ring are provided with recesses $d$ for fitting over the circumference of the rings A and B. Within the casing formed by the disks A and B and the ring or tire C is arranged a movable member D, which is seated by its center-portion on a hub G into which the axle of the vehicle is fitted and the inner part of which may be made of any suitable shape, according to the nature of the transmitting gearing to be used.

In the space within the ring $b$ a ring F is arranged on which is placed a pneumatic tire T, the circumference of which is placed in contact with the inner circumference of the ring $b$. The disk-shaped member D is arranged between the disks A and B, the member D being placed on the hub G. The flange of the hub G, the member D and the rim F provided with extension-sleeves $e$ are all connected by means of screws or bolts $f$ and nuts $g$, as shown in Fig. 2. The pneumatic tire T may be made of tubular shape and fitted around the rim F and held in proper position on the same by its own expansion in the usual well-known manner. The disks A and B are connected by means of four studs E, which are adapted to slide in radial slots $s$ of the member D and the corresponding transverse slots $t$ which are arranged in the disks A and B as shown in Fig. 3. The axle moves eccentrically by means of the slots and afterward resumes its central position so as to transmit motive force from the inner portion of the parts toward the outer part, whatever be the system of gears employed. The pneumatic tire T absorbs the shocks incident to use without subjecting the pneumatic tire to liability to damage by puncture or atmospheric influences. Screws $r$ seated in the disk D enter at their inner ends the outer ends of the slots $s$, and thereby limit the eccentric movement of the disk; said screws are adjustable radially of the slots and by adjusting the same a greater or less relative movement of the wheel parts is permitted.

Having thus described my invention, I claim as new and desire to secure by Letters Patent:

A resilient wheel comprising outer and inner disks of equal size arranged parallel and co-axial with each other and provided with slots, radial ridges on the outer face of the outer disk and forming inwardly disposed shoulders, a ring resting against said shoulders, a movable member arranged between said disks, radial slots in said member, crossing the slots of the disks, studs passing through said member and engaging in said slots, a hub having a flange and passing through the center of said member, bolts passing through said flange and member, a rim on said bolts, sleeves on said bolts and holding said rim spaced from said member, a tire on said rim and engaging said ring, and screws radially adjustable at their ends in said slots for limiting the movement of said studs.

In testimony that I claim the foregoing as my invention, I have signed my name in presence of two subscribing witnesses.

VICENTE GIL-DELGADO Y OLAZABAL.

Witnesses:
 JOSÉ ROEB,
 LOCADIA LÓPEC.